(12) United States Patent
Andersen et al.

(10) Patent No.: US 7,452,085 B2
(45) Date of Patent: Nov. 18, 2008

(54) DYNAMICALLY ADJUSTABLE FOLD-MIRROR ASSEMBLY FOR PROJECTION DEVICE

(75) Inventors: Karl Andersen, Engelsviken (NO); Michael Försth, Västra Frölunda (SE)

(73) Assignee: Infocus Corporation, Wilsonville, OR (US)

( * ) Notice: Subject to any disclaimer, the term of this patent is extended or adjusted under 35 U.S.C. 154(b) by 179 days.

(21) Appl. No.: 11/177,432

(22) Filed: Jul. 7, 2005

(65) Prior Publication Data
US 2007/0008500 A1    Jan. 11, 2007

(51) Int. Cl.
G03B 21/14   (2006.01)
G03B 21/28   (2006.01)
H04N 5/57    (2006.01)
H04N 5/74    (2006.01)
G02B 26/08   (2006.01)
G02B 5/08    (2006.01)
G02B 7/182   (2006.01)

(52) U.S. Cl. .................. 353/97; 353/99; 348/687; 348/771; 348/782; 359/214; 359/225; 359/862; 359/872

(58) Field of Classification Search ............. 353/97, 353/20, 37, 50, 51, 77, 78, 98, 99, 102, 119, 353/122; 348/673, 687, 739, 744, 782, 771; 349/5, 7–9; 359/214, 223, 225, 226, 838, 359/862, 872–874, 876, 877; 345/77
See application file for complete search history.

(56) References Cited

U.S. PATENT DOCUMENTS

| 5,467,146 A | 11/1995 | Huang |
| 6,637,894 B2 | 10/2003 | Dewald |
| 2005/0024602 A1* | 2/2005 | Shimaoka et al. ............. 353/94 |
| 2005/0237490 A1* | 10/2005 | Hibi et al. ..................... 353/30 |

* cited by examiner

*Primary Examiner*—Rochelle-Ann Blackman
(74) *Attorney, Agent, or Firm*—Schwabe Williamson & Wyatt

(57) ABSTRACT

An apparatus, system, and method for a fold-mirror assembly with a dynamically adjustable mirror element for use in a projection device are disclosed herein.

18 Claims, 2 Drawing Sheets

DYNAMICALLY ADJUSTABLE FOLD-MIRROR ASSEMBLY FOR PROJECTION DEVICE

FIELD

Embodiments of the invention relate generally to the field of projection systems, and more particularly to providing a dynamically adjustable fold-mirror assembly for use in such systems.

BACKGROUND

Multimedia projection systems have become popular for purposes such as conducting sales demonstrations, business meetings, classroom training, and for use in home theaters. In typical operation, multimedia projection systems receive analog video signals from an input device and convert the video signals to digital information to control one or more digitally driven light modulators. Depending on the cost, brightness, and image quality goals of the particular projection systems, the light modulators may be of various sizes and resolutions, be transmissive or reflective, and be employed in single or multiple display configurations.

Current projection systems are capable of creating millions of colors by using light modulator pixels to selectively transmit or reflect primary colored light through a projection lens for viewing. However, current projection systems have difficulty reproducing frames with wide ranges of luminances from deep black to bright white, while still providing adequate resolutions. This is particularly noticeable in frames primarily composed of image pixels on the darker end of the luminance spectrum.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a dynamically adjustable fold mirror to adjust the amount of light throughput through a projection device, and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments. In particular, a wide variety of optical components not specifically shown such as, but not limited to, prisms, mirrors, lenses, and integration elements may be used as appropriate to fold, bend, or modify the illumination for the intended application.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
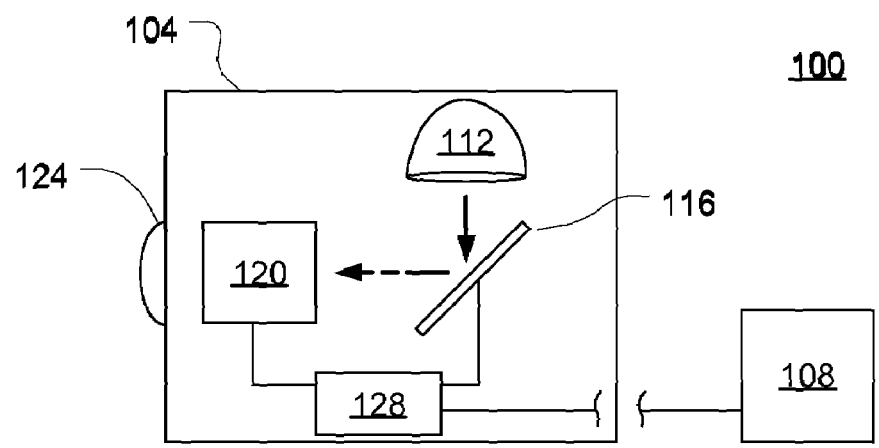
FIG. 1 illustrates a projection system having a projection device and an image source, in accordance with an embodiment of the present invention.

FIG. 1 illustrates a projection system 100 having a projection device 104 coupled to an image source 108, in accordance with an embodiment of the present invention. The projection device 104 may be configured to receive an image signal, from the image source 108, and to project an image based at least in part on the image signal.

For the purpose of this description, a still image may be considered as a degenerate or special video where there is only one frame. Accordingly, both still image and video terminologies may be used in the description to follow, and they are not to be construed to limit the embodiments of the present invention to the rendering of one or the other.

The projection device 104 may include a light source 112 optically coupled to a fold-mirror assembly 116, which may be in turn optically coupled to a light modulator 120. As used herein, "optically coupled" means the capability of light to be directly or indirectly provided from one component to another. In the present embodiment, the light source 112 may provide light to the fold-mirror assembly 116, which may have a mirror element angularly disposed relative to the light source 112. The fold-mirror assembly 116 may then reflect the light towards a light modulator 120, thereby optically coupling the light source 112 to the light modulator 120. As used herein, the fold-mirror assembly 116 may be any assembly capable of facilitating this optical coupling of the light source 112 to the downstream light modulator 120.

A controller 128, which may be coupled to receive the image signal from the image source 108, may transmit light modulator control signals to the light modulator 120 based at least in part on the image signal. The light modulator control signals may cause matrix-addressable elements of the light modulator 120 to modulate the light, through selective reflection or transmission, thereby outputting an image corresponding to the image signal. The image may then be projected, by a projection lens 124, onto a screen or some other mechanism for viewing. In this embodiment, the projection lens 124 is shown with two lens elements; however, it may have more or less lens elements in other embodiments.

The controller 128 may also be coupled to the fold-mirror assembly 116. Given certain predefined conditions, e.g., an image that is below a predetermined brightness value, which may be determined by reference to the image signal, the controller 128 may adjust the angular disposition of the mirror element of the fold-mirror assembly 116 thereby adjusting the amount of light provided to the light modulator 120 and ultimately projected. The adjustment of the angular disposition of the mirror element may be between, e.g., a full-luminance position and a reduced-luminance position. In various embodiments, there may be any number of reduced-luminance positions, including gradual increments to a substantially no-luminance position.

The resulting reduction of luminance may allow for more grayscale resolution to be displayed in the darker image frames by adapting the light modulator control signals to the reduced luminance. For example, assuming that during a dark frame, the majority of the modulating elements are activated between 0-20 percent. If the overall luminance is reduced by half in those dark frames, the modulating elements may be activated twice the amount, e.g., 0-40 percent, thereby gaining twice the grayscale resolution.

Furthermore, dynamic luminance reduction taught by embodiments of the present invention may facilitate the improvement of black-level performance of the projection device 104.

The image source 108 may include a computing device, DVD, set-top box (STB), video camera, video recorder, an integrated television tuner, or any other suitable device to transmit signals, e.g., image signals, to the projection device 104. In various embodiments, the system 100 may be, for example, a projector or a projection television.

In one embodiment the light source 112 may include a polychromatic light source such as a gaseous discharge lamp (e.g., high-pressure mercury, tungsten, halogen, or metal halide). In other embodiments, monochromatic light sources may be used to produce light of the desired color. Examples of monochromatic light sources that may be used include, but are not limited to, light-emitting diodes and laser diodes.

In one embodiment, the light modulator 120 may include, e.g., a liquid crystal light modulator. Examples of these types of light modulators include, but are not limited to, transmissive displays, e.g., using thin-film-transistors (TFT) on polysilicon (P-Si), as well as reflective displays such as LCoS (Liquid Crystal on Silicon). In other embodiments, the light modulator may have one or more digital micro mirror displays (DMDs).

Figure 2:
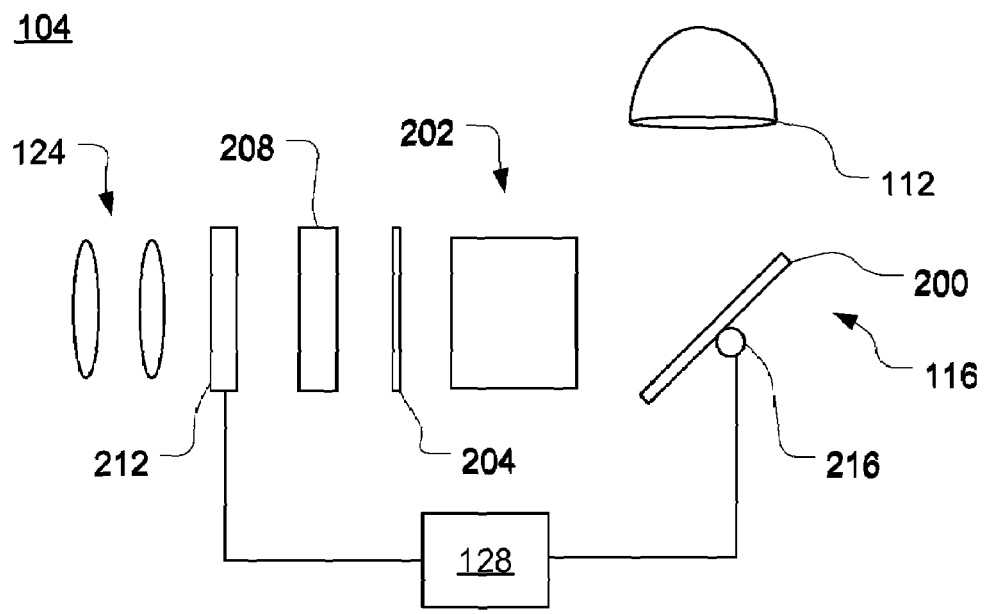
FIG. 2 illustrates the projection device in greater detail, in accordance with an embodiment of the present invention.

FIG. 2 illustrates the projection device 104 in greater detail, according to one embodiment of the present invention. Light reflected off of the fold-mirror assembly 116, and more particularly, off of a mirror element 200 of the fold-mirror assembly 116, may be transmitted to an integrating device 202. The integrating device 202, which may be a fly eye-lens integrator, an integrating tunnel, etc., may homogenize and/or shape the light received from the fold-mirror assembly 116. The integrating device 202 may also facilitate transmission of the light through a mask 204.

Figure 3:
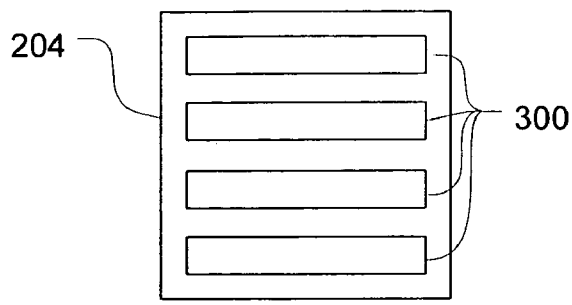
FIG. 3 illustrates a mask for use in the projection device, in accordance with an embodiment of the present invention.

The mask 204, shown in greater detail in FIG. 3 in accordance with an embodiment of the present invention, may include one or more apertures 300. Light directed through the apertures 300 may be transmitted to a polarization beam splitter (PBS) 208. The PBS 208 may polarize the light in a manner to facilitate the selective modulation from the light modulator 120, which in this embodiment may be a liquid crystal device.

The apertures 300 of the mask 204 may be arranged in a way to facilitate the light being incident upon the PBS 208 in a manner that may result in a greater chance that the PBS 208 polarize the light appropriately for the downstream light modulator 120. The mask 204 being used in this manner may also be referred to as a PBS mask.

Although the embodiment shown depicts four apertures 300 as substantially uniform rectangles, other embodiments may have other number of apertures and may additionally/alternatively employ apertures of other shapes.

While the fold-mirror assembly 116 is in a full-luminance state, the mirror element 200 may be angled such that a majority of the light from the light source 112 is directed through the apertures 300, via the lens 202. The controller 128 may determine that a reduction in the total luminance provided to the light modulator 120 is desirable and may therefore switch the fold-mirror assembly 116 to a reduced-luminance state by controlling a mechanical actuator 216 to transition the mirror element 200 so that less light is directed through the apertures 300. The mask 204 may reflect the light back towards a light-absorbing area of a frame or towards a reflector of the light source 112.

Preventing at least a portion of the light from hitting downstream components, e.g., the PBS 208 and the light modulator 120, while the fold-mirror assembly 116 is in the reduced-luminance state may protect the components from unnecessary high levels of light. This may, in turn, increase performance and the longevity of the components.

In this embodiment, the actuator 216 may rotate the mirror element 200 around a centrally located axis (as shown). In another embodiment, the mirror element 200 may have a rotational axis closer to, or at an edge.

In various embodiments, the actuator 216 may be a device such as, but not limited to, a voice coil, a linear actuator, and a step motor.

In one embodiment, the amount of light reduction due to the adjustment of the fold-mirror assembly 116 may be proportional to the brightness of the image. This may be determined by analysis of the image signal received from the image source 108. In various embodiments, a wide variety of algorithms may be developed to correlate the light reduction to the image brightness.

As shown in FIG. 2, the fold-mirror assembly 116 has a single mirror element, i.e., mirror element 200. In other embodiments, the fold-mirror assembly 116 may include a number of mirror elements. These mirror elements may be controlled in a manner such that while the fold-mirror assembly 116 is in a full-luminance state, the mirror elements are substantially parallel to one another and direct the light downstream to the light modulator 120. The controller 128, in response to a darker image frame, may then adjust the mirror elements in order to reduce the amount of light presented to the light modulator 120. In one embodiment, the controller 128 may adjust a first set of the mirror elements, which may be any number of elements from one to all of the elements, to reflect light in a manner such that it is not transmitted through the apertures 300 of the mask 204. The mirror elements not of the first set, if any, may continue to transmit a portion of the light through the apertures 300. In one embodiment, an integration tunnel may be used to integrate the light reflected from the fold-mirror assembly 116 prior to processing by the light modulator 120.

While embodiments of the present invention discuss the fold-mirror assembly 116 causing at least a portion of the light to be blocked by the mask 204 while in the reduced-luminance state, other embodiments may rely on other techniques to cause at least a portion of the light to not be processed through the downstream components. For example, in one embodiment, the fold-mirror assembly 116 may reflect at least a portion of the light outside of the light-processing capabilities of the downstream components, sometimes referred to as the attendee, while in a reduced-luminance state.

Figure 4:
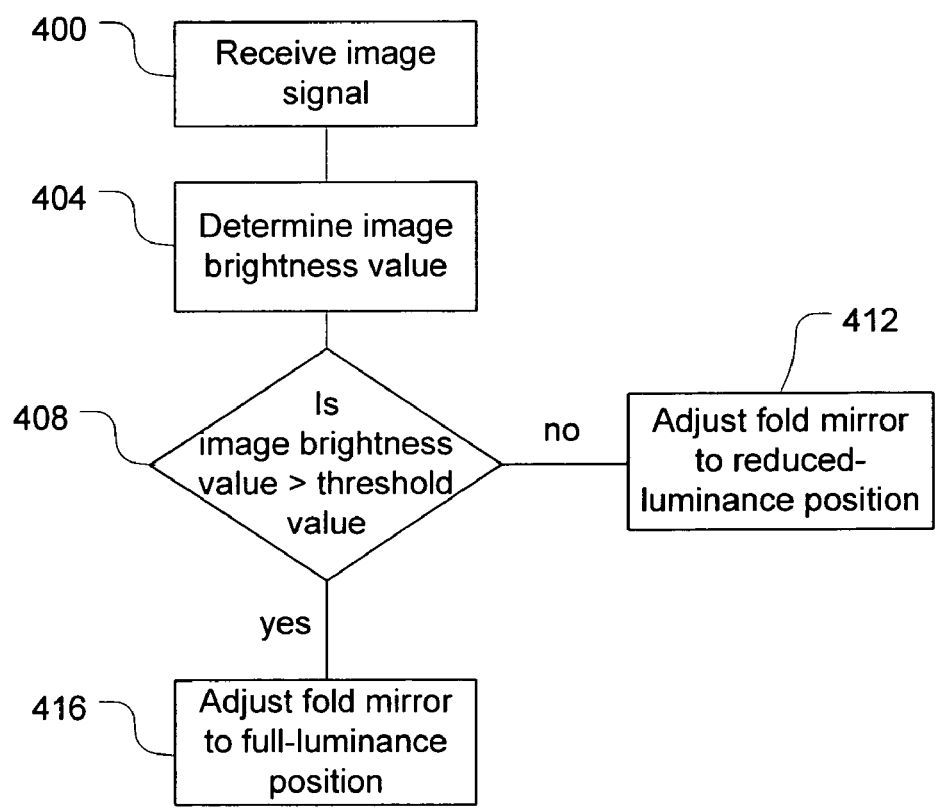
FIG. 4 illustrates a manner for reducing light through a projection device, in accordance with an embodiment of the present invention.

FIG. 4 illustrates a manner for reducing light through a projection device in accordance with one embodiment of the present invention. The elements discussed in reference to the present embodiment may be similar to like-named elements discussed above.

In the present embodiment, a controller may receive an image signal from an image source 400. The controller may analyze the image signal and develop an image brightness value 404. This image brightness value may then be compared to a predetermined threshold value 408. If the image brightness value is greater than the threshold value, the controller may adjust one or more fold-mirror elements to be in a full-luminance position 412. If, however, the image brightness value is less than the threshold value, the controller may adjust the one or more fold-mirror elements to be in a reduced-luminance position 416.

As discussed above, in various embodiments there may be a number of reduced-luminance states and/or threshold values. This may provide a light modulator with a graduated reduction of light commensurate with a graduated reduction of image brightness levels.

In other embodiments, other statistical operations may be used to determine whether an image frame would benefit from a reduction of the total illumination provided to the light modulator.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A projection device comprising:
   a light source configured to provide light;
   a controller configured to generate a first control signal to receive an image signal and to output a second control signal based at least in part on the image signal;
   a fold-mirror assembly coupled to the controller and positioned to receive light from the light source, the fold-mirror assembly having a mirror element configured to be in a first angular disposition relative to the light source and to transition to a second angular disposition relative to the light source based at least in part on the first control signal;
   an aperture mask having one or more apertures configured to transmit a first amount of light while the mirror element is in the first angular disposition and to transmit a second amount of light while the mirror element is in the second angular disposition, the second amount being less than the first amount; and
   a light modulator coupled to the controller and optically coupled to the fold-mirror assembly and configured to receive light from the fold-mirror assembly and to modulate the light based at least in part on the second control signal.

2. The projection device of claim 1, further comprising: a polarizing beam splitter configured to receive light transmitted through the one or more apertures.

3. The projection device of claim 1, further comprising: an integrating device configured to receive light from the fold mirror assembly and to direct the light through the one or more apertures.

4. The projection device of claim 1, wherein the fold-mirror assembly further comprises:
   an actuator coupled to the mirror element and to the controller and configured to receive the first control signal and to transition the mirror element from the first angular disposition to the second angular disposition.

5. The projection device of claim 1, wherein the controller is further configured to generate the first control signal based at least in part on the image signal.

6. The projection device of claim 1, wherein the fold-mirror assembly further comprises a plurality of mirror elements, a first set of the plurality of mirror elements configured to be in a first angular disposition relative to the light source and to transition to the second angular disposition relative to the light source based at least in part on the first control signal.

7. The projection device of claim 1, wherein the aperture mask is located downstream of the fold-mirror assembly.

8. A system comprising:
   an image source configured to output an image signal; and
   a projection device coupled to the image source and configured to receive the image signal and to project an image based at least in part on the image signal, the projection device including
   a light source configured to provide light;
   a controller configured to generate a first control signal and a second control signal, the second control signal based at least in part on the image signal,
   a fold-mirror assembly coupled to the controller and positioned to receive light from the light source, the fold-mirror assembly having a mirror element configured to be in a first angular disposition relative to the light source and to transition to a second angular disposition relative to the light source based at least in part on the first control signal;
   an aperture mask having one or more apertures configured to transmit a first amount of light while the mirror element is in the first angular disposition and to transmit a second amount of light while the mirror element is in the second angular disposition, the second amount being less than the first amount; and
   a light modulator coupled to the controller and optically coupled to the fold-mirror assembly and configured to receive light from the fold-mirror assembly and to modulate the light based at least in part on the second control signal.

9. The system of claim 8, wherein the controller is further configured to generate the first control signal based at least in part on the image signal.

10. The system of claim 9, wherein the controller is further configured:
    to determine an image brightness value based at least in part on the image signal;
    to compare the image brightness value to a threshold value; and
    to generate the first control signal based at least in part on said comparison.

11. The system of claim 8, wherein the image source is a source selected from the group consisting of a computing device, a digital versatile disk (DVD), a set-top box, and an integrated television tuner.

12. The system of claim 8, wherein the fold-mirror assembly further comprises:
    an actuator coupled to the mirror element and to the controller and configured to receive the first control signal and to transition the mirror element from the first angular disposition to the second angular disposition.

13. The system of claim 8, wherein the fold-mirror assembly further comprises a plurality of mirror elements, a first set of the plurality of mirror elements configured to be in a first angular disposition relative to the light source and to transition to the second angular disposition relative to the light source based at least in part on the first control signal.

14. The system of claim 8, wherein the aperture mask is located downstream of the fold-mirror assembly.

15. An apparatus comprising:
a light source configured to provide light;
a controller configured to receive an image signal and to generate a first control signal and a second control signal, the second control signal generated based at least in part on the image signal;
a fold-mirror assembly coupled to the controller and positioned to receive light from the light source, the fold-mirror assembly having a mirror element configured to be in a first angular disposition relative to the light source and to transition to a second angular disposition relative to the light source based at least in part on the first control signal; and
a light modulator configured to receive light from the fold-mirror assembly and to modulate the light based at least in part on the second control signal.

16. The apparatus of claim 15, wherein the controller is further configured to generate the first control signal based at least in part on the image signal.

17. The apparatus of claim 15, wherein the fold-mirror assembly further comprises a plurality of mirror elements, a first set of the plurality of mirror elements configured to be in a first angular disposition relative to the light source and to transition to the second angular disposition relative to the light source based at least in part on the first control signal.

18. The apparatus of claim 15, further comprising:
an aperture mask located downstream of the fold-mirror assembly, the aperture mask having one or more apertures configured to transmit a first amount of light while the mirror element is in the first angular disposition and to transmit a second amount of light while the mirror element is in the second angular disposition, the second amount being less than the first amount.

* * * * *